United States Patent
Simonin et al.

(10) Patent No.: US 12,500,303 B2
(45) Date of Patent: Dec. 16, 2025

(54) STRUCTURAL SIDE PLATE FOR A RECHARGEABLE ENERGY STORAGE SYSTEM

(71) Applicant: GM Global Technology Operations LLC, Detroit, MI (US)

(72) Inventors: Matthew Simonin, Ortonville, MI (US); Patrick H. Clark, Royal Oak, MI (US); Ryan J. Prescott, Burton, MI (US); Xianfeng Yan, Clawson, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 490 days.

(21) Appl. No.: 18/153,449

(22) Filed: Jan. 12, 2023

(65) Prior Publication Data

US 2024/0243403 A1 Jul. 18, 2024

(51) Int. Cl.
*H01M 50/204* (2021.01)
*H01M 10/65* (2014.01)
*H01M 50/249* (2021.01)
*H01M 50/264* (2021.01)

(52) U.S. Cl.
CPC ......... *H01M 50/204* (2021.01); *H01M 10/65* (2015.04); *H01M 50/249* (2021.01); *H01M 50/264* (2021.01); *H01M 2220/20* (2013.01)

(58) Field of Classification Search
CPC .. H01M 50/204; H01M 10/65; H01M 50/249; H01M 50/264; H01M 2220/20; H01M 10/613; H01M 10/625; H01M 10/6556; H01M 50/209; H01M 50/244; B60K 1/04; B60L 50/66; Y02E 60/10
See application file for complete search history.

(56) References Cited

U.S. PATENT DOCUMENTS

| | | | | |
|---|---|---|---|---|
| 3,167,458 | A * | 1/1965 | Brazell | H01M 50/209 429/10 |
| 9,023,504 | B2 * | 5/2015 | Kim | H01M 10/647 429/129 |
| 2015/0311485 | A1 * | 10/2015 | Fister | H01M 50/262 429/151 |
| 2019/0326569 | A1 * | 10/2019 | Chi | H01M 50/204 |
| 2025/0105464 | A1 * | 3/2025 | Kim | H01M 10/6554 |

* cited by examiner

*Primary Examiner* — Michael L Dignan
(74) *Attorney, Agent, or Firm* — CANTOR COLBURN LLP

(57) ABSTRACT

A rechargeable energy storage system (RESS), in accordance with a non-limiting example, includes a first energy storage cell including a first outer surface, a second outer surface, a first lateral side, and a second lateral side. The second lateral side includes a first structural side plate including a first side member extending from the first outer surface toward the second outer surface. A second energy storage cell includes a first outer surface portion, a second outer surface portion, a first lateral side surface, and a second lateral side surface. The first lateral side surface includes a second structural side plate including a second side member extending from the second outer surface portion toward the first outer surface portion. The first side member stacks with the second side member to form an interface joining the first energy storage cell with the second energy storage cell.

20 Claims, 6 Drawing Sheets

STRUCTURAL SIDE PLATE FOR A RECHARGEABLE ENERGY STORAGE SYSTEM

INTRODUCTION

The subject disclosure relates to the art of rechargeable energy storage systems and, more particularly, to a structural side plate for joining multiple cells of a rechargeable energy storage system for a vehicle.

Electric vehicles include rechargeable energy storage systems (RESS) that store power used to operate an electric motor. The electric motor provides motive power for the vehicle. The RESS is typically formed from multiple cells arranged in cell holders that are joined one, to another to form a pack. The pack is often connected to a pack tray which serves as an interface with the vehicle. A cold plate and a thermal interface material (TIM) are generally mounted to the pack. The cold plate absorbs heat from the pack while the TIM enhances thermal transfer between the pack and the cold plate.

Typically, each cell holder includes a flange that is connected to the pack tray. The use of cell flanges creates gaps between adjacent cell holders. The gaps have a width that is substantially equal to a width of two flanges. The pack tray is designed to fit into a designated space in the vehicle. The gaps take up space on the pack tray thereby limiting the number and/or size of cells in each cell holder. Further, the gaps create interruptions in a structural load path that extends across the RESS. Interruptions in the load path require additional structural supports in order to accommodate crash forces. Accordingly, it is desirable to provide a system for interconnecting cell holders for an RESS that conserves space on the pack track and also creates an uninterrupted load path.

SUMMARY

A rechargeable energy storage system (RESS), in accordance with a non-limiting example, includes a first energy storage cell including a first outer surface, a second outer surface opposite the first outer surface, a first lateral side, and a second lateral side opposite the first lateral side. The second lateral side includes a first structural side plate including a first side member extending from the first outer surface toward the second outer surface. The first side member is spaced from the second outer surface. A second energy storage cell includes a first outer surface portion, a second outer surface portion opposite the first outer surface portion, a first lateral side surface, and a second lateral side surface opposite the first lateral side. The first lateral side surface includes a second structural side plate including a second side member extending from the second outer surface portion toward the first outer surface portion. The second side member being spaced from the first outer surface portion. The first side member stacks with the second side member to form an interface joining the first energy storage cell with the second energy storage cell. The interface forms a substantially uninterrupted load path between the first lateral side and the second lateral side surface.

In addition to one or more of the features described herein the first side member is substantially hollow and the second side member is substantially hollow, wherein each of the first side member and the second side member define a cooling channel that extends between the first energy storage cell and the second energy storage cell.

In addition to one or more of the features described herein the first side member includes a first surface spaced about halfway between the first outer surface and the second outer surface and a second surface arranged at the second outer surface.

In addition to one or more of the features described herein the second side member includes a first surface portion arranged at the first outer surface and a second surface portion spaced about halfway between the first outer surface and the second outer surface.

In addition to one or more of the features described herein the first side member includes a first plurality of bushings that extends between the first surface and the second surface.

In addition to one or more of the features described herein the second side member includes a second plurality of bushings that extend between the first surface portion and the second surface portion, the second plurality of bushings selectively align with the first plurality of bushings.

In addition to one or more of the features described herein a mechanical fastener extending through each of the first plurality of bushings and the second plurality of bushings.

In addition to one or more of the features described herein a first clamp down plate arranged at each of the first plurality of bushings on the first surface, and a second clamp down plate arranged at each of the second plurality of bushings on the first surface portion, the each of the plurality of mechanical fasteners connect the first clamp down plate to the second clamp down plate.

In addition to one or more of the features described herein the first clamp down plate engages the first outer surface and the first outer surface portion and the second clamp down plate engages the second outer surface and the second outer surface portion.

In addition to one or more of the features described herein each of the plurality of mechanical fasteners threadably engage with the second clamp down plate.

A vehicle in accordance with a non-limiting example, includes a body, an electric motor supported relative to the body, and a rechargeable energy storage system (RESS) operatively connected to the electric motor. The RESS includes a first energy storage cell including a first outer surface, a second outer surface opposite the first outer surface, a first lateral side, and a second lateral side opposite the first lateral side. The second lateral side includes a first structural side plate including a first side member extending from the first outer surface toward the second outer surface. The first side member is spaced from the second outer surface. A second energy storage cell includes a first outer surface portion, a second outer surface portion opposite the first outer surface portion, a first lateral side surface, and a second lateral side surface opposite the first lateral side. The first lateral side surface includes a second structural side plate including a second side member extending from the second outer surface portion toward the first outer surface portion. The second side member is spaced from the first outer surface portion. The first side member stacks with the second side member to form an interface joining the first energy storage cell with the second energy storage cell. The interface forms a substantially uninterrupted load path between the first lateral side and the second lateral side surface.

In addition to one or more of the features described herein the first side member is substantially hollow and the second side member is substantially hollow, wherein each of the first side member and the second side member define a cooling channel that extends between the first energy storage cell and the second energy storage cell.

In addition to one or more of the features described herein the first side member includes a first surface spaced about halfway between the first outer surface and the second outer surface and a second surface arranged at the second outer surface.

In addition to one or more of the features described herein the second side member includes a first surface portion arranged at the first outer surface and a second surface portion spaced about halfway between the first outer surface and the second outer surface.

In addition to one or more of the features described herein the first side member includes a first plurality of bushings that extends between the first surface and the second surface.

In addition to one or more of the features described herein the second side member includes a second plurality of bushings that extend between the first surface portion and the second surface portion, the second plurality of bushings selectively align with the first plurality of bushings.

In addition to one or more of the features described herein a mechanical fastener extending through each of the first plurality of bushings and the second plurality of bushings.

In addition to one or more of the features described herein a first clamp down plate arranged at each of the first plurality of bushings on the first surface, and a second clamp down plate arranged at each of the second plurality of bushings on the first surface portion, each of the plurality of mechanical fasteners connect the first clamp down plate to the second clamp down plate.

In addition to one or more of the features described herein the first clamp down plate engages the first outer surface and the first outer surface portion and the second clamp down plate engages the second outer surface and the second outer surface portion.

In addition to one or more of the features described herein each of the plurality of mechanical fasteners threadably engage with the second clamp down plate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
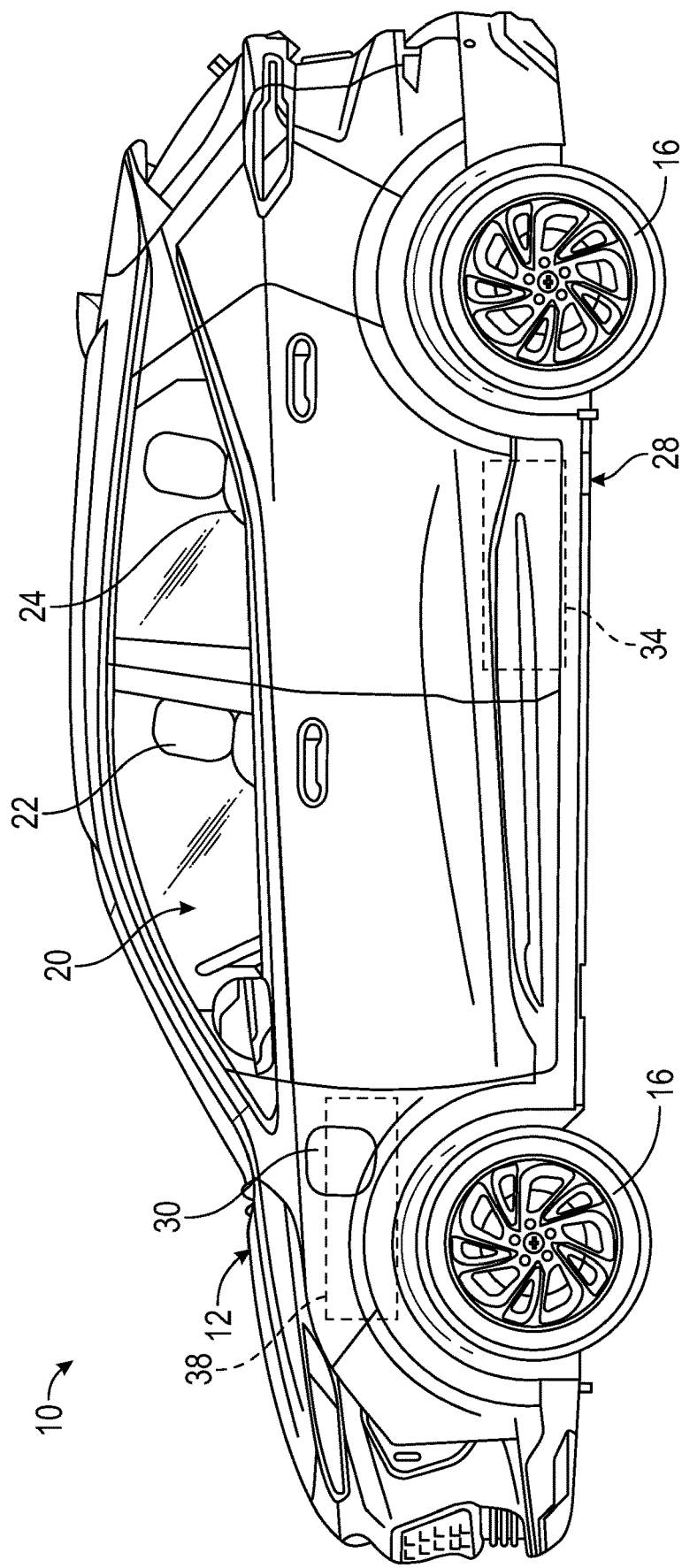
FIG. 1 is a left side view of a vehicle including a rechargeable energy storage system (RESS) having a multiple cells joined through a structural side plate, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown) and a plurality of wheels, two of which are indicated at 16. Body 12 includes a passenger compartment 20 that includes a driver's seat 22 and at least one rear passenger seat 24. Vehicle 10 takes the form of an electric vehicle (EV) 28 including a charge port 30. Charge port 30 serves as an interface between an external charging device (not shown) and a rechargeable energy storage system (RESS) 34 supported in body 12. RESS 34 is operatively connected to an electric motor 38 that provides motive power to vehicle 10.

Figure 2:
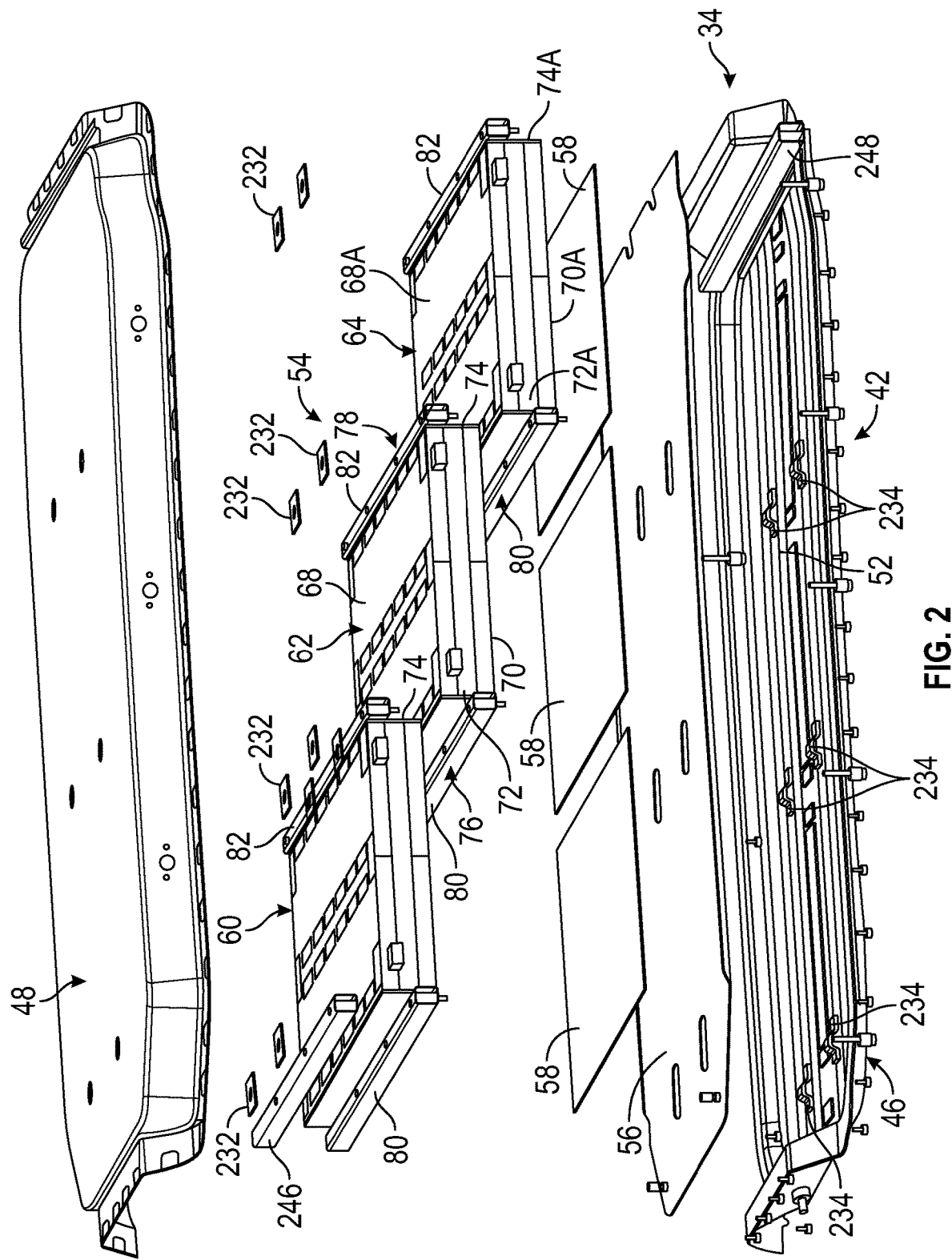
FIG. 2 is a disassembled view of the RESS of FIG. 1, in accordance with a non-limiting example.

Referring to FIG. 2, RESS 34 includes a housing 42 including a lower portion or pack tray 46 and an upper portion or pack cover 48. Pack tray 46 includes a support surface 52. A plurality of interconnected energy storage cells, indicated generally at 54, is mounted to support surface 52. In a non-limiting example, a cold plate 56 is arranged at an interface between the plurality of interconnected energy storage cells 54 and support surface 52. A plurality of thermal interface members 58 enhance heat transfer between each of the plurality of interconnected energy storage cells 54 and cold plate 56. In the non-limiting example shown, the plurality of interconnected energy storage cells 54 includes a first energy storage cell 60, a second energy storage cell 62, and a third energy storage cell 64.

Figure 3:
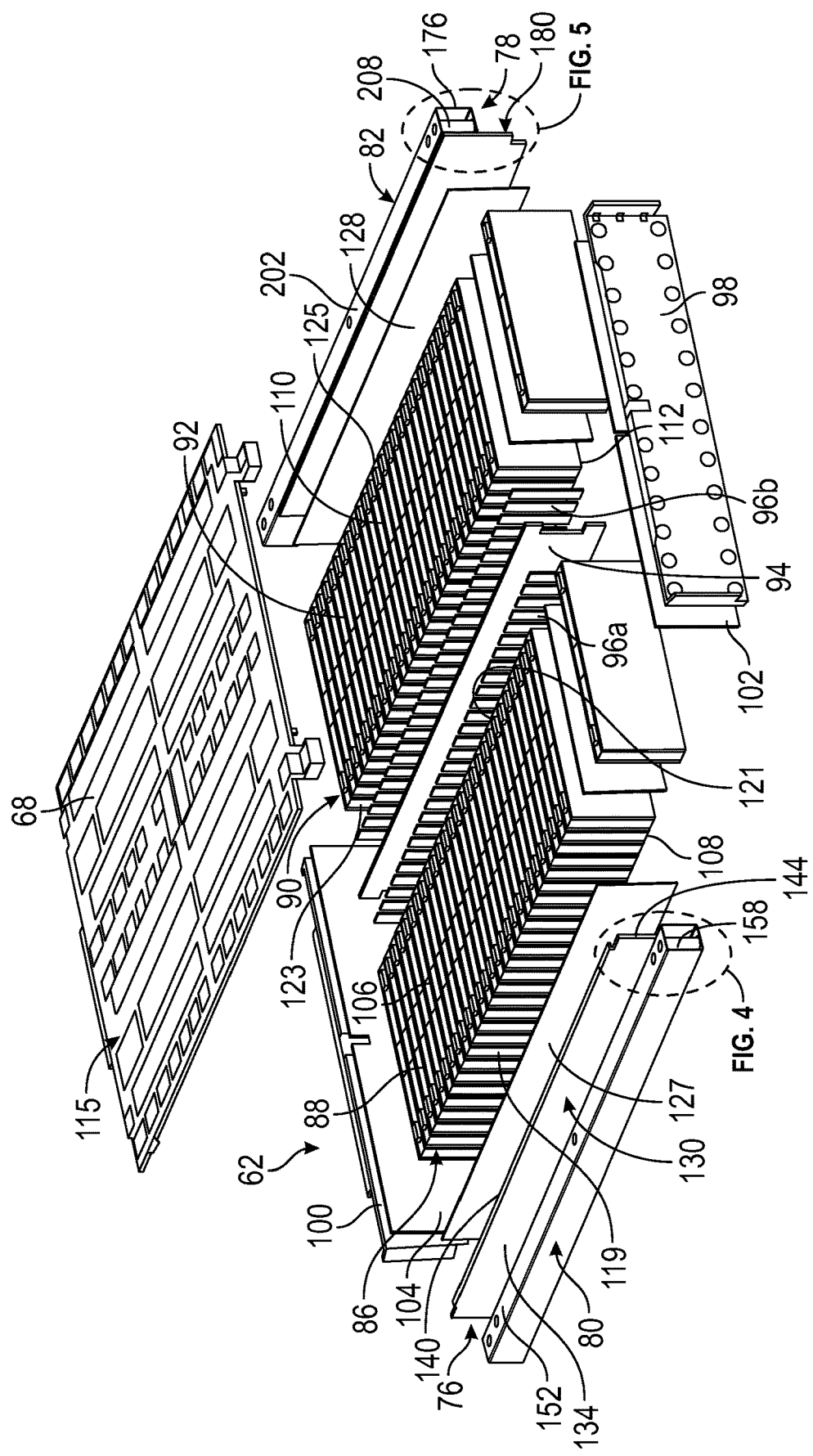
FIG. 3 is a disassembled view of one of the multiple cells of the RESS of FIG. 2, in accordance with a non-limiting example.

Reference will now follow to FIGS. 2 and 3 in describing second energy storage cell 62. Second energy storage cell 62 includes a first outer surface 68, a second outer surface 70 that is opposite first outer surface 68, a first lateral side 72, and a second lateral side 74 that is opposite first lateral side 72. In accordance with a non-limiting example, a first structural side plate 76 is coupled to first lateral side 72 and a second structural side plate 78 is coupled to second lateral side 74. First and second structural side plates 76 and 78 provide an interface with first energy storage cell 60 and third energy storage cell 64 respectively. In a non-limiting example, first structural side plate 76 includes a first side member 80 and second structural side plate 78 includes a second side member 82. At this point, it should be understood that first energy storage cell 60 and third energy storage cell 64 include similar structure. For example, third energy storage cell 64 includes a first outer surface portion 68A and a second outer surface portion 70A, a first lateral side surface 72A and a second lateral side surface 74A.

In a non-limiting example depicted in FIG. 3, second energy storage cell 62 includes a first plurality of cells 86 arranged in a first cell stack 88 and a second plurality of cells 90 arranged in a second cell stack 92. First cell stack 88 is separated from second cell stack 92 by a mid-plate 94. Mid-plate 94 supports a first plurality of conductors 96a electrically connected to the first plurality of cells 86 and a second plurality of conductors 96b electrically connected to the second plurality of cells 90.

First and second cell stacks 88 and 92 are joined by a first end plate 98 and a second end plate 100 arranged opposite first end plate 98. First and second end plates 98 and 100 are arranged substantially perpendicularly to mid-plate 94. A first foam member 102 is disposed between first end plate 98 and first and second cell stacks 88 and 92 and a second foam member 104 is arranged between second end plate 100 and first and second cell stacks 88 and 92.

First cell stack 88 includes a first outer surface portion 106 and a second outer surface portion 108 that is opposite first outer surface portion 106. Second cell stack 92 includes a first outer surface section 110 and a second outer surface section 112 that is opposite first outer surface section 110. An interconnect board 115 (FIG. 3) is mounted to first outer surface portion 106 and first outer surface section 110. Interconnect board 115 establishes a selected electrical connection of the first plurality of cells 86 and the second plurality of cells 90.

In a non-limiting example, first cell stack 88 includes a first side surface 119 that defines first lateral side surface 72 and a second side surface 121 that is opposite first side surface 119. Second cell stack 92 includes a first side surface portion 123 and a second side surface portion 125 that is opposite first side surface portion 123. Second side surface portion 125 defines second lateral side surface 74. First structural side plate 76 is connected to first side surface 119 through a first structural adhesive member 127 and second structural side plate 78 is connected to second side surface portion 125 through a second structural adhesive member 128.

Figure 4:
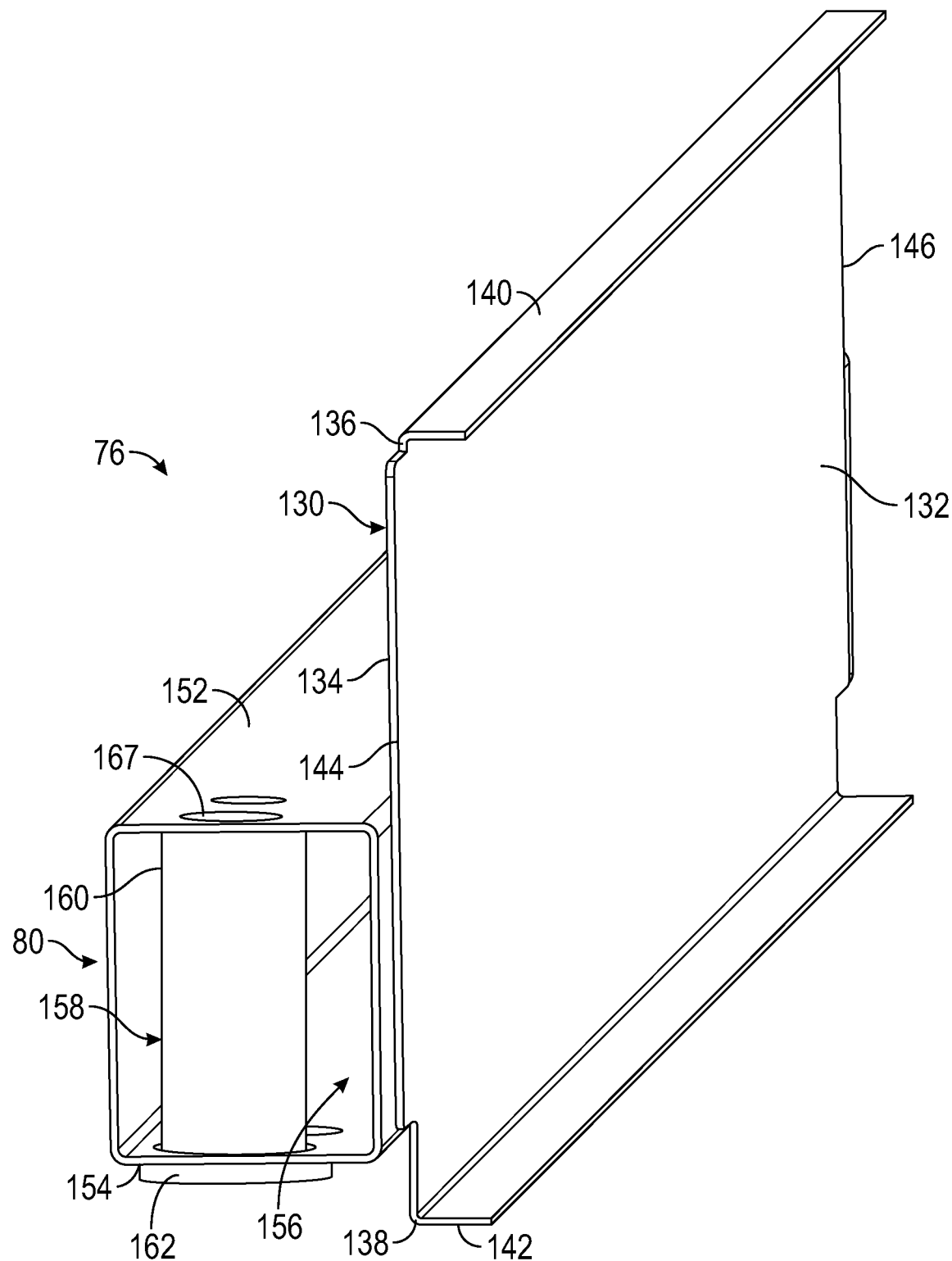
FIG. 4 is a perspective view of a first structural side plate of the one of the multiple cells of FIG. 3, in accordance with a non-limiting example.

Reference will now follow to FIG. 4 with continued reference to FIG. 3 in describing first structural side plate 76. In a non-limiting example, first structural side plate 76 includes a first plate element 130 having an inner surface 132 that faces first side surface 119 and an outer surface 134. First plate element 130 also includes a first or upper edge portion 136 and a second or lower edge portion 138. First edge portion 136 includes a first projection 140 and second edge portion 138 includes a second projection 142. First projection 140 and second projection 142 extend outwardly of inner surface 132. First plate element 130 is further shown to include a forward edge portion 144 and a rear edge portion 146. Forward edge portion 144 and rear edge portion 146 extend between and connect with first edge portion 136 and second edge portion 138.

In a non-limiting example, first side member 80 is mounted to outer surface 134. First side member 80 is arranged adjacent to second edge portion 138 and extends between forward edge portion 144 and rear edge portion 146. First side member 80 includes a first surface 152, a second surface 154 that is opposite to first surface 152, and a hollow interior 156 that may define a cooling channel (not separately labeled). First surface 152 is spaced about halfway between first outer surface 68 and second outer surface 70. A first plurality of bushings, one of which is indicated at 158, is arranged in hollow interior 156. Each bushing 158 includes a first end 160 arranged at first surface 152 and a second end 162 arranged at second surface 154. A first passage 164 (FIG. 7) extends between first end 160 and second end 162. First side member 80 includes a first opening 167 formed in first surface 152 that connects with first end 160 of each bushing 158. A second opening 169 (FIG. 7) is formed in second surface 154 and aligns with second end 162 of each bushing 158.

Figure 5:
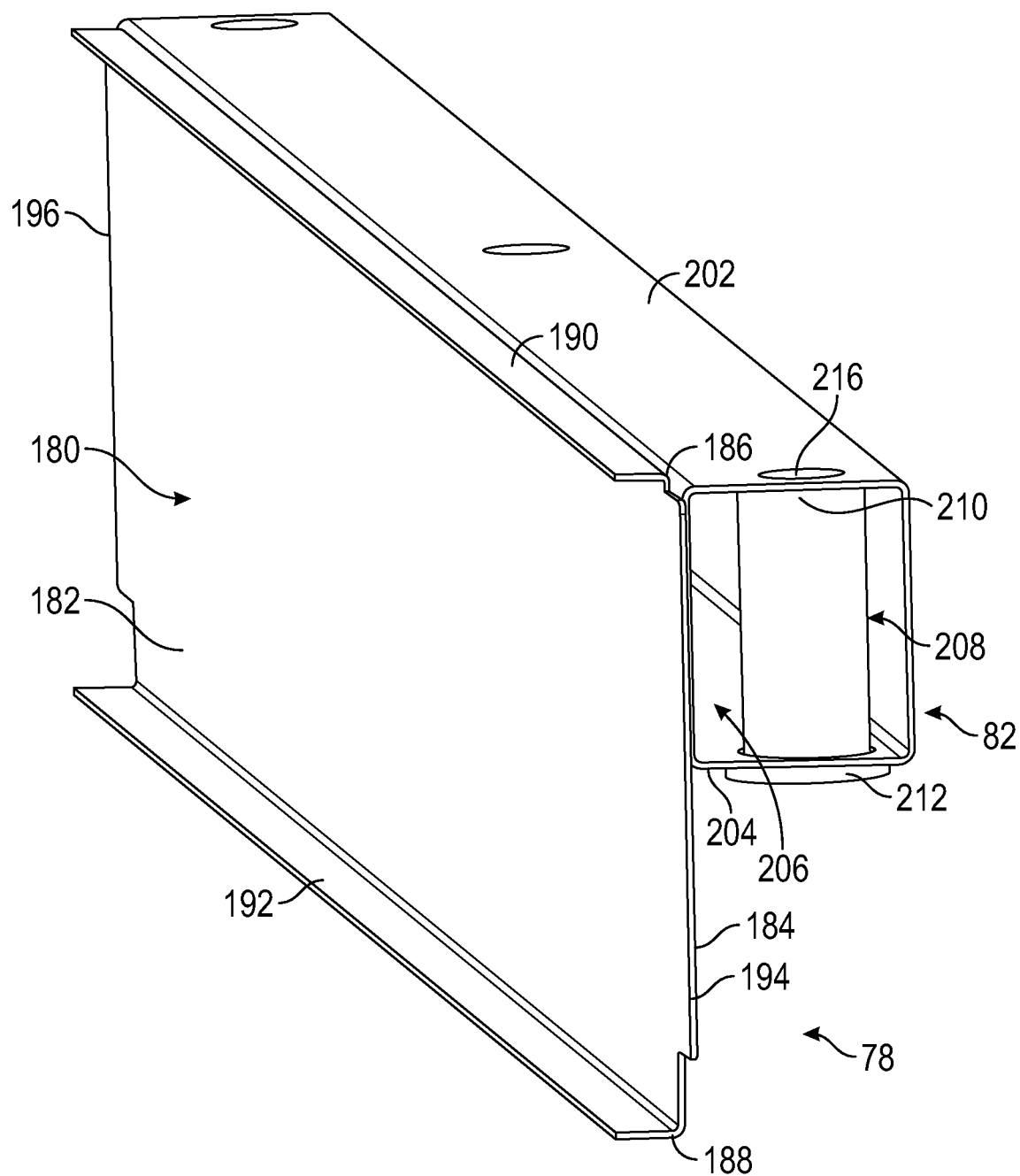
FIG. 5 is a perspective view of a second structural side plate of the one of the multiple cells of FIG. 3, in accordance with a non-limiting example

In a non-limiting example shown in FIG. 5, second structural side plate 78 includes a second plate element 180 having an inner surface portion 182 that faces second side portion 125 of second cell stack 92 and an outer surface portion 184. Second plate element 180 also includes a first or upper edge section 186 and a second or lower edge section 188. A first projection element 190 extends outwardly of inner surface portion 182 at first edge section 186. A second projection element 192 projects outwardly of inner surface portion 182 at second edge section 192. Second plate element 180 is further shown to include a forward edge section 194 and a rear edge section 196. Forward edge section 194 and rear edge section 196 extend between and connect with first edge section 186 and second edge section 188.

In a non-limiting example, second side member 82 is mounted to outer surface portion 184. Second side member 82 is arranged adjacent to first edge section 186 and extends between forward edge section 194 and rear edge section 196. Second side member 82 includes a first surface portion 202, a second surface portion 204 that is opposite to first surface portion 202, and a hollow interior portion 206 that may define a cooling channel (not separately labeled). Second surface portion 204 is spaced about halfway between first outer surface 68 and second outer surface 70. A second plurality of bushings, one of which is indicated at 208, is arranged in hollow interior 206. Each bushing 208 includes a first end section 210 arranged at first surface portion 202 and a second end section 212 arranged at second surface portion 204. A second passage 214 (FIG. 7) extends between first end section 210 and second end section 212. Second side member 82 includes a first opening portion 216 formed in first surface portion 202 that connects with first end section 210 of each bushing 208. A second opening portion is formed in second surface portion 204 and aligns with second end section 212 of each bushing 208.

Figure 6:
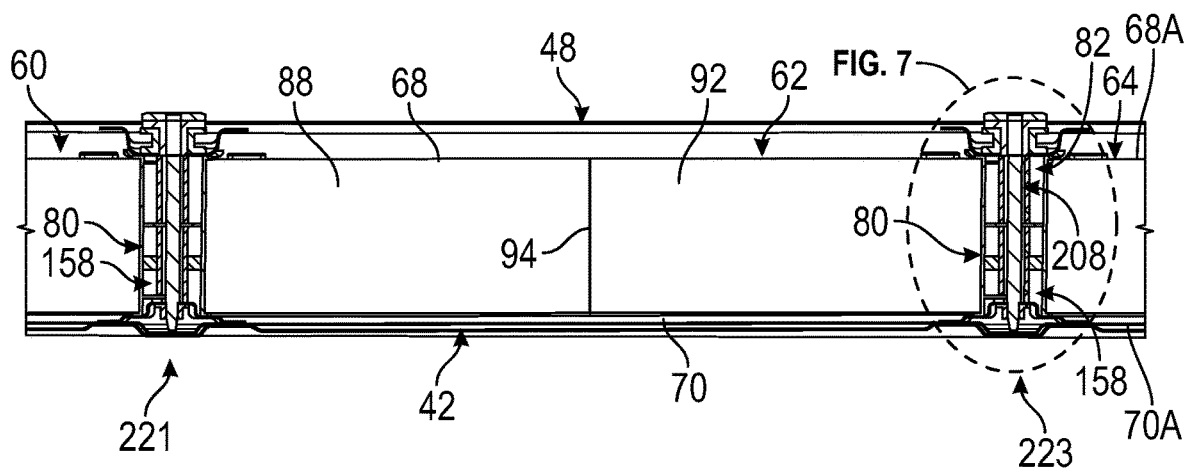
FIG. 6 is an elevational view of two adjacent cells of the RESS of FIG. 2 including joints formed by two structural side plates, in accordance with a non-limiting example.

Referring to FIG. 6, first and second side members 80 and 82 serve as an interface between second energy storage cells 62 and first energy storage cell 60 and between second energy storage cell 62 and third energy storage cell 64 respectively. More specifically, first side member 80 supports and is connected with a second side member 82 on first energy storage cell 60 forming a first joint 221 and second side member 82 on second energy storage cell 62 is supported by and is connected with a first side member 80 on third energy storage cell 64 forming a second joint 223.

Figure 7:
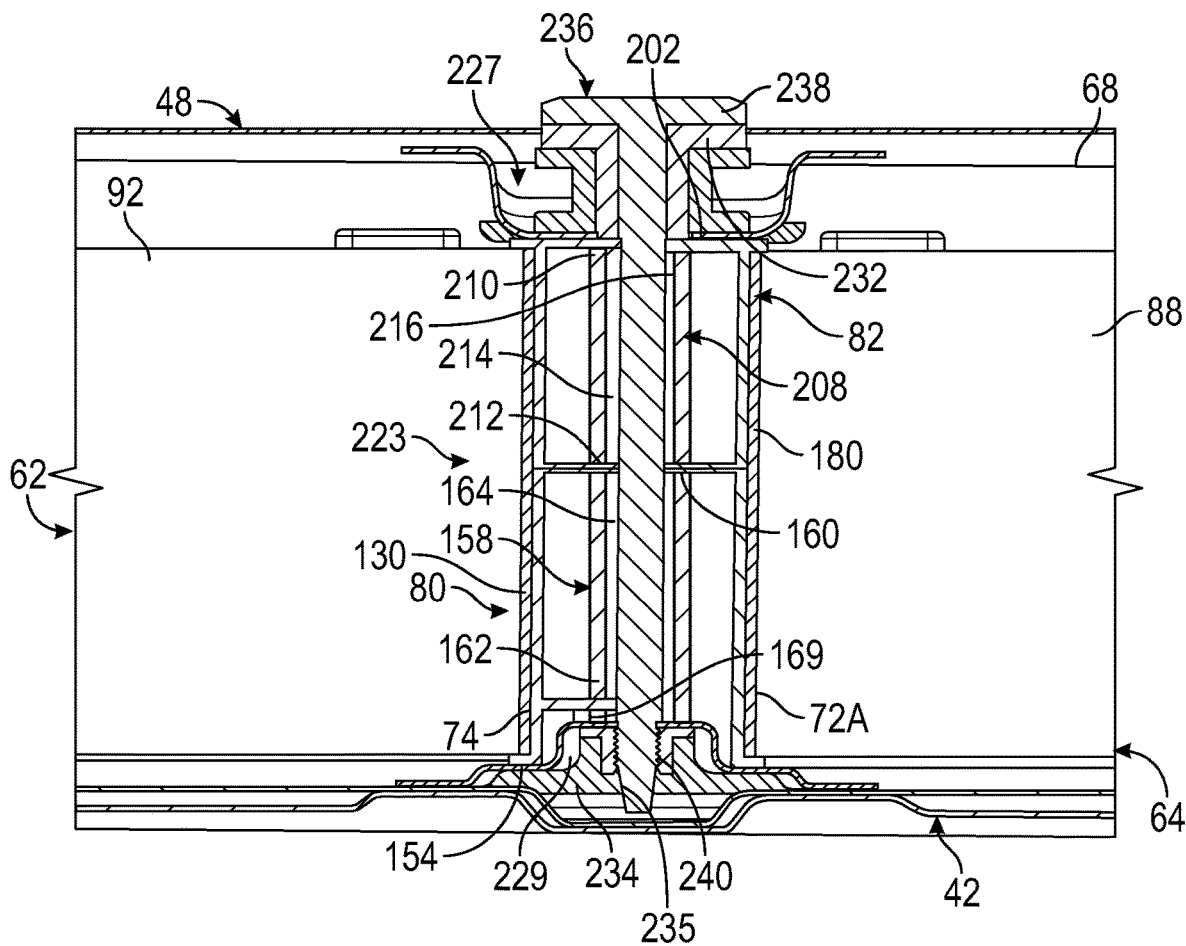
FIG. 7 is an elevational view of one of the joints formed by two structural side plates, in accordance with a non-limiting example.

Reference will now follow to FIG. 7 in describing second joint 223 with an understanding that first joint 221 includes similar structure. Pack cover 48 includes a first or upper recess 227 that extends to second side member 82 and pack tray 42 includes a second or lower recess 229 that extends to first side member 80. A first plurality of clamp down plates, one of which is indicated at 232 extends into first recess 227 toward first surface portion 202 on second side member 82. In a non-limiting example, first clamp down plate 232 acts upon first surface portion 202. A second plurality of clamp down plates, one of which is indicated at 234 is arranged in second recess 229. Second clamp down plate 234 includes a threaded passage 235. Second clamp down plate 234 acts upon the second surface 154 of the first side member 80 on third energy storage cell 64.

In a non-limiting example, a mechanical fastener 236 is passed through each first clamp down plate, into second side member 82, through the first side member on third energy storage cell 64, and into each second clamp down plate 234. Each mechanical fastener 236 includes a head end 238 that may be engaged by a tool (not shown) and a threaded end 240 that engages threaded passage 235 in second clamp down plate 234. Mechanical fasteners 236 are tightened to join first, second, and third energy storage cells 60, 62, and 64. In addition, a first side member support 246 is coupled to the first side member (not separately labeled) on first energy storage cell 60 and a second side member support 248 is mounted to pack tray 46 to support the second side member (also not separately labeled) on third energy storage cell 64.

At this point, it should be understood that the structural side plates, in accordance with non-limiting examples, create a stacked connection between adjacent energy storage cells. The stacked connection not only reduces the amount of real estate needed to connect cells to a pack tray but also creates a more uniform load cross pack load path that allows the RESS to absorb greater crash forces. Further, the stacked connection results in a substantially uninterrupted load path across the RESS.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rechargeable energy storage system (RESS) defining a first axis, a second axis orthogonal to the first axis, and a third axis orthogonal to the first axis and the second axis, first and second directions extending opposite each other along the first axis, and third and fourth directions extending opposite each other along the second axis, the RESS comprising:

a first energy storage cell including a first outer surface facing the first direction, a second outer surface opposite the first outer surface and facing the second direction, a first lateral side facing the third direction, and a second lateral side opposite the first lateral side and facing the fourth direction, the second lateral side including a first structural side plate including a first side member extending in the second direction from the first outer surface, wherein the first side member being spaced from the second outer surface along the first axis; and a second energy storage cell including a first outer surface portion facing the first direction, a second outer surface portion opposite the first outer surface portion and facing the second direction, a first lateral side surface facing the third direction, and a second lateral side surface opposite the first lateral side surface and facing the fourth direction, the first lateral side surface including a second structural side plate including a second side member extending in the first direction from the second outer surface portion, the second side member being spaced from the first outer surface portion along the first axis, wherein the first side member stacks with the second side member along the first axis with direct contact between the first lateral side of the first energy storage cell and the second lateral side surface of the second energy storage cell to form an interface joining the first energy storage cell with the second energy storage cell, the interface defining a direct structural load path along the second axis between the first lateral side and the second lateral side surface, and wherein the first side member is hollow and defines a first cooling channel extending along the third axis entirely through the first side member, wherein the second side member is hollow and defines a second cooling channel extending along the third axis entirely through the second side member, wherein the first side member comprises a plurality of first bushings extending entirely through the first side member along the first axis, the first bushing passing through the first cooling channel, wherein the second side member comprises a plurality of first bushings extending entirely through the second side member along the first axis, the second bushing passing through the second cooling channel, and wherein the first bushings and the second bushings are aligned along the first axis.

2. The RESS according to claim 1, wherein a halfway point is defined equidistant from the first outer surface and the second outer surface along the first axis, wherein the first side member includes a first surface perpendicular to the first axis and positioned closer to the halfway point than to the first outer surface and the second outer surface, and a second surface perpendicular to the first axis and positioned closer to the second outer surface than the halfway point.

3. The RESS according to claim 2, wherein a second halfway point is defined equidistant from the first outer surface portion and the second outer surface portion along the first axis, wherein the second side member includes a first surface portion perpendicular to the first axis and positioned closer to the first outer surface portion than the second halfway point and a second surface portion perpendicular to the first axis and positioned closer to the second halfway point than the first outer surface portion and the second outer surface portion.

4. The RESS according to claim 3, further comprising a plurality of mechanical fasteners extending through each of the first bushings and the second bushings.

5. The RESS according to claim 4, further comprising a first clamp down plate arranged at each of the of bushings on the first surface, and a second clamp down plate arranged at each of the second bushings on the first surface portion, the each of the plurality of mechanical fasteners connect the first clamp down plate to the second clamp down plate.

6. The RESS according to claim 5, wherein the first clamp down plate engages the first outer surface and the first outer surface portion and the second clamp down plate engages the second outer surface and the second outer surface portion.

7. The RESS according to claim 6, wherein each of the plurality of mechanical fasteners threadably engage with the second clamp down plate.

8. The RESS according to claim 4, wherein the mechanical fasteners extend entirely through the first bushings and the second bushings.

9. The RESS according to claim 1,
wherein the first structural side plate comprises a first planar structure that extends along the first axis and the third axis, and the first side member includes a first wall that extends along the first axis and the third axis, the first planar structure directly attached to an entirety of an outer surface of the first wall, and
wherein the second structural side plate comprises a second planar structure that extends along the first axis and the third axis, and the second side member includes a second wall that extends along the first axis and the third axis, the second planar structure directly attached to an entirety of an outer surface of the second wall.

10. The RESS according to claim 1,
wherein the first planar structure and the second planar structure do not directly contact each other, and
wherein the first side member and the second side member do not overlap each other along the second axis.

11. A vehicle comprising:
a body;
an electric motor supported relative to the body; and
a rechargeable energy storage system (RESS) operatively connected to the electric motor, the RESS defining a first axis, a second axis orthogonal to the first axis, and a third axis orthogonal to the first axis and the second axis, first and second directions extending opposite each other along the first axis, and third and fourth directions extending opposite each other along the second axis, the RESS includes:
a first energy storage cell including a first outer surface facing the first direction, a second outer surface opposite the first outer surface and facing the second direction, a first lateral side facing the third direction, and a second lateral side opposite the first lateral side and facing the fourth direction, the second lateral side including a first structural side plate including a first side member extending in the second direction from the first outer surface, wherein the first side member being spaced from the second outer surface along the first axis; and
a second energy storage cell including a first outer surface portion facing the first direction, a second outer surface portion opposite the first outer surface portion and facing the second direction, a first lateral side surface facing the third direction, and a second lateral side surface opposite the first lateral side surface and facing the fourth direction, the first lateral side surface including a second structural side plate including a second side member extending in the first direction from the second outer surface portion, the second side member being spaced from the first outer surface portion along the first axis,
wherein the first side member stacks with the second side member along the first axis with direct contact between the first lateral side of the first energy storage cell and the second lateral side surface of the second energy storage cell to form an interface joining the first energy storage cell with the second energy storage cell, the interface defining a direct structural load path along the second axis between the first lateral side and the second lateral side surface, and
wherein the first side member is hollow and defines a first cooling channel extending along the third axis entirely through the first side member,
wherein the second side member is hollow and defines a second cooling channel extending along the third axis entirely through the second side member,
wherein the first side member comprises a plurality of first bushings extending entirely through the first side member along the first axis, the first bushing passing through the first cooling channel,
wherein the second side member comprises a plurality of first bushings extending entirely through the second side member along the first axis, the second bushing passing through the second cooling channel, and
wherein the first bushings and the second bushings are aligned along the first axis.

12. The vehicle according to claim 11,
wherein a halfway point is defined equidistant from the first outer surface and the second outer surface along the first axis,
wherein the first side member includes a first surface perpendicular to the first axis and positioned closer to the halfway point than to the first outer surface and the second outer surface, and a second surface perpendicular to the first axis and positioned closer to the second outer surface than the halfway point.

13. The vehicle according to claim 12,
wherein a second halfway point is defined equidistant from the first outer surface portion and the second outer surface portion along the first axis,
wherein the second side member includes a first surface portion perpendicular to the first axis and positioned closer to the first outer surface portion than the second halfway point and a second surface portion perpendicular to the first axis and positioned closer to the second halfway point than the first outer surface portion and the second outer surface portion.

14. The vehicle according to claim 13, further comprising a mechanical fastener extending through each of the first bushings and the second bushings.

15. The vehicle according to claim 14, further comprising a first clamp down plate arranged at each of the first bushings on the first surface, and a second clamp down plate arranged at each of the second plurality of bushings on the first surface portion, each of the plurality of mechanical fasteners connect the first clamp down plate to the second clamp down plate.

16. The vehicle according to claim 15, wherein the first clamp down plate engages the first outer surface and the first outer surface portion and the second clamp down plate engages the second outer surface and the second outer surface portion.

17. The vehicle according to claim 16, wherein each of the plurality of mechanical fasteners threadably engage with the second clamp down plate.

18. The vehicle according to claim 14, wherein the mechanical fasteners extend entirely through the first bushings and the second bushings.

19. The vehicle according to claim 11,
wherein the first structural side plate comprises a first planar structure that extends along the first axis and the third axis, and the first side member includes a first wall that extends along the first axis and the third axis, the first planar structure directly attached to an entirety of an outer surface of the first wall, and
wherein the second structural side plate comprises a second planar structure that extends along the first axis and the third axis, and the second side member includes a second wall that extends along the first axis and the third axis, the second planar structure directly attached to an entirety of an outer surface of the second wall.

20. The vehicle according to claim 11,
wherein the first planar structure and the second planar structure do not directly contact each other, and
wherein the first side member and the second side member do not overlap each other along the second axis.

\* \* \* \* \*